(12) United States Patent
Zhang

(10) Patent No.: US 6,924,003 B2
(45) Date of Patent: Aug. 2, 2005

(54) METHOD OF PROCESSING A NANOTUBE USING A SELECTIVE SOLID STATE REACTION

(75) Inventor: Yuegang Zhang, Tokyo (JP)

(73) Assignee: NEC Corporation (JP)

(*) Notice: Subject to any disclaimer, the term of this patent is extended or adjusted under 35 U.S.C. 154(b) by 500 days.

(21) Appl. No.: 09/739,477

(22) Filed: Dec. 18, 2000

(65) Prior Publication Data

US 2001/0004471 A1 Jun. 21, 2001

(30) Foreign Application Priority Data

Dec. 17, 1999 (JP) ............................................. 11-359579

(51) Int. Cl.$^7$ ............................. D01F 9/12; D01F 11/10; D01F 11/12; B05D 3/02; B26D 3/16

(52) U.S. Cl. ...................... 427/374.1; 427/545; 427/557; 427/180; 427/226; 427/399; 427/903; 83/54; 423/445 B; 423/447.1; 423/460

(58) Field of Search ................................ 427/545, 551, 427/557, 592, 77, 78, 226, 355, 372.2, 374.1, 444, 903, 180, 399; 216/83, 94; 83/54; 423/445 R, 445 B, 447.1, 447.2, 447.3, 447.8, 460, 461

(56) References Cited

U.S. PATENT DOCUMENTS

| | | | | |
|---|---|---|---|---|
| 3,811,928 A | * | 5/1974 | Henney et al. | 428/428 |
| 4,224,379 A | * | 9/1980 | Ichinose et al. | 428/461 |
| 4,389,465 A | * | 6/1983 | Nakai et al. | 428/698 |
| 4,461,665 A | * | 7/1984 | Schertler | 156/210 |
| 6,101,316 A | * | 8/2000 | Nagashima et al. | 392/388 |
| 6,231,980 B1 | * | 5/2001 | Cohen et al. | 428/402 |
| 6,277,318 B1 | * | 8/2001 | Bower et al. | 264/346 |
| 6,283,812 B1 | * | 9/2001 | Jin et al. | 445/24 |
| 6,296,894 B1 | * | 10/2001 | Tanabe et al. | 427/8 |
| 6,452,171 B1 | * | 9/2002 | Moloni | 250/307 |

FOREIGN PATENT DOCUMENTS

WO    WO 98/05920 A1 * 2/1998

OTHER PUBLICATIONS

Zhang et al., "Controllable method for fabricating single-wall carbon nanotube tips", App. Phys. Lett., vol. 77, No. 7, pp. 966–968, Aug. 14, 2000.*

"A Carbon Nanotube Field–Emission Electron Source" by W.A. Heer et al Science—vol. 270, Nov. 17, 1995 pp. 1179–1180.

"Unraveling Nanotubes: Field Emission from an Atomic Wire" by A.G. Rinzle, et al Science—vol. 269, Sep. 15, 1995 pp. 1550–1553.

"A Simple and Robust Electron Beam Source from Carbon Nanotubes" by P.G. Collins et al Appl. Phys. Lett., vol. 69 No. 13 Sep. 23, 1996 pp. 1969–1971.

"Field Emission from Nanotube Bundle Emitters at Low Fields" by Q.H. Wang et al Appl. Phys. Lett., vol. 70, No. 24 Jun. 16, 1997 pp. 3308–3310.

"Field Emission Patterns from Single–Walled Carbon Nanotubes" by Y. Saito et al Jpn. J. Appl. Phys., vol. 36 (1997) Part 2, No. 10A, Oct. 1, 1997 pp. 1340–1342.

"Field Emission from Single–Wall Carbon Nanotube Films" by J.M. Bonard et al Applied Physics Letters, vol. 73, No. 7 Aug. 17, 1998 pp. 918–920.

(Continued)

Primary Examiner—Timothy Meeks
Assistant Examiner—Wesley D. Markham
(74) Attorney, Agent, or Firm—Hayes Soloway P.C.

(57) ABSTRACT

The present invention provides a method of processing a nanotube, comprising the steps of: causing a selective solid state reaction between a selected part of a nanotube and a reactive substance to have the selected part only become a reaction product; and separating the nanotube from the reaction product to define an end of the nanotube.

29 Claims, 4 Drawing Sheets-

OTHER PUBLICATIONS

"Microscopic Structure of As–Grown Single–Wall Carbon Nanotubes by Laser Ablation" by Y. Zhang et al Philosophical Magazine Letters, 1998, vol. 78, No. 2 pp. 139–144.

"Purification of Single–Wall Carbon Nanotubes by Ultrasonically Assisted Filtration" by K.B. Shelimov et al Chemical Physics Letters 282, Jan. 23, 1998 pp. 429–434.

"Controlled Deposition of Individual Single–Walled Carbon Nanotubes on Chemically Functionalized Templates" by J.Liu et al Chemical Physics Letters 303, Apr. 2, 1999 pp. 125–129.

"Purification of Single–Wall Carbon Nanotubes" by Z. Shi et al Solid State Communications 112, 1999 pp. 35–37.

* cited by examiner

METHOD OF PROCESSING A NANOTUBE USING A SELECTIVE SOLID STATE REACTION

BACKGROUND OF THE INVENTION

The present invention relates to a method of processing a nanotube, and more particularly to a method of processing a nanotube, which is suitable for cutting the nanotube and for forming a top of the nanotube.

A single-walled carbon nanotube has an extremely fine structure of nanometer order. Properties of the single-walled carbon nanotube have been on the investigation. The research and developments of the single-walled carbon nanotube for application have been active. The single-walled carbon nanotube comprises a single layer of graphite hexagonal network. An electron structure largely varies depending upon a diameter of the tube and chiral angle, for which reason the electrical conductivity of the carbon nanotube varies between a conductivity of a metal and a conductivity of a semiconductor, and further the carbon nanotube exhibits a property similar to one-dimensional electric conduction.

The carbon nanotube may be applied to a field emitter. This field emitter has been known and is disclosed in (1) W. A. de Heer, A. Chatelain, and D. Ugarte, Science 270, 1179 (1995); (2) A. G. Rinzler, J. H. Hafner, P. Nikolaev, L. Lou, S. G. Kim, D. Tomanek, P. Nordlander, D. T. Colbert, and R. E. Smalley, Science, 269, 1550 (1995); (3) P. G. Collins and A. Zettl, Appl. Phys. Lett., 69, 1969 (1996); (4) Q. H. Wang, T. D. Corrigan, J. Y. Dai, P. R. H. Chang, and A. R. Krauss, Appl. Phys. Lett., 70, 3308 (1997); (5) Y. Saito, K. Hamaguchi, T. Nishino, K. Hata, K. Tohji, A. Kasuya, and Y. Nishina, Jpn. J. Appl. Phys., 36, L1340 (1997); (6) J-M. Bonard, J-P. Salvetat, T. Stockli, W A. de Heer, L. Forro, and A. Chatelain, Appl. Phys. Lett., 73, 918 (1998).

The sharpness of the top of the field emitter of the carbon nanotube emphasizes the field effect and realizes the good characteristic of the field emission.

No practicable method of operating the nanotube tip and controlling the same has been established, for which reason the conventional carbon nanotube is extremely low in probability of having an optimum directionality and serving as a useful electron emitter. As shown in (7) Y Zhang and S. Iijima, Philos. Mag. Lett., 78, 139 (1998), the most of the manufactured single-walled carbon nanotube is large in aspect ratio or is slender and further is curved, for which reason it is difficult to practice the single-walled carbon nanotube.

It is actually difficult that the plural nanotube tips are arranged in the same direction and the plural nanotubes are aligned along a single line. As shown in the above literature (7), it is actually difficult to evaluate the nanotube tip with a probe.

In order to have solved the above problem, there was proposed a method of cutting the single carbon nanotube by an oxidation using nitric acid, an acid mixed with nitric acid or sulfuric acid. The cutting method is disclosed in (8) K. B. Shelimov, R. O. Esenaliev, A. G. Rinzler, C. B. Huffman, and R. E. Smalley, Chem. Phys. Lett., 282, 429 (1998); (9) J. Liu, M. J. Casavant, M. Cox, D. A. Walters, P. Boul, W. Lu, A. J. Rimberg, K. A. Smith, D. T. Colbert, and R. E. Smalley, Chem. Phys. Lett., 303, 125 (1999); (10) Z. Shi, Y. Lian, F. Liao, X. Zhou, Z. Gu, Y. Zhang, and S. Iijima, Solid State Comm., 112 (1999) 35.

The above cutting method for cutting the single-walled carbon nanotube is incapable of cutting, at a specified site, the single-walled carbon nanotube. Namely, the above cutting method is unable to specify the cutting site of the single-walled carbon nanotube. Since the above cutting method is the chemical wet process using acid such as nitric acid and sulfuric acid, the acid provides undesirable influence to the manufacturing process. The above conventional cutting method is unsuitable for forming the micro device.

In the above circumstances, it had been required to develop a novel method of processing a nanotube free from the above problem.

SUMMARY OF THE INVENTION

Accordingly, it is an object of the present invention to provide a novel method of processing a nanotube free from the above problems.

It is a further object of the present invention to provide a novel method of processing a nanotube without using any chemical wet process.

It is a still further object of the present invention to provide a novel method of selectively processing a top portion of a nanotube in a specific shape.

It is yet a further object of the present invention to provide a novel method of selectively processing a top portion of a nanotube in a specific shape which is suitable for an electron device such as a field emission electron gun.

The present invention provides a method of processing a nanotube, comprising the steps of: causing a selective solid state reaction between a selected part of a nanotube and a reactive substrate to have the selected part only become a reaction product; and separating the nanotube from the reaction product to define an end of the nanotube.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1A:
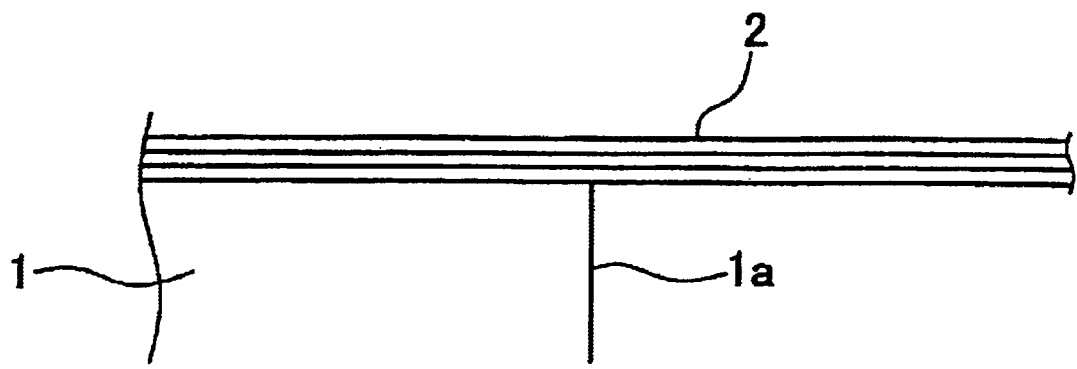
FIGS. 1A through 1C are fragmentary cross sectional elevation views illustrative of a novel method of forming a top of the single-walled carbon nanotube in a preferred embodiment in accordance with the present invention.

The present invention in one aspect provides a method of processing a nanotube, comprising the steps of: causing a selective solid state reaction between a selected part of a nanotube and a reactive substrate to have the selected part only become a reaction product; and separating the nanotube from the reaction product to define an end of the nanotube.

It is preferable that the step of causing a selective solid-state reaction further comprises the steps of: selectively contacting the part of the nanotube with the reactive substrate; and causing the selective solid state reaction on a contacting region of the selected part of the nanotube and the reactive substrate to have the selected part only become the reaction product, wherein a boundary between the reaction product and the nanotube is self-aligned to an edge portion of the contacting region of the selected part of the nanotube and the reactive substrate.

In a preferred embodiment the solid state reaction is caused by heating the reactive substrate.

Preferably the reactive substrate is heated by an irradiation of a heat ray onto the reactive substrate.

In such preferred embodiment the heat ray is an infrared ray.

In another preferred embodiment the reactive substrate is heated by applying a current between the reactive substrate and the nanotube.

It is also preferable that the step of contacting the part of the nanotube with the reactive substrate further comprises the steps of: dispersing a carbon nanotube into an organic solvent to form a dispersion liquid; applying the dispersion liquid onto a surface of the reactive substrate; and evaporating the organic solvent from the dispersion liquid to leave the nanotube on the reactive substrate.

In a preferred embodiment the nanotube is separated from the reaction product by rapidly cooling the reaction product.

In one preferred embodiment the nanotube is a single-walled nanotube.

In another preferred embodiment the nanotube is a multi-walled nanotube.

In one preferred embodiment the nanotube is a carbon nanotube.

In another preferred embodiment the nanotube is a boron nitride based nanotube.

It is also preferable that the reactive substrate is a metal.

In one preferred embodiment the reactive substrate is Nb.

In another preferred embodiment the reactive substrate is a semiconductor.

Preferably the reactive substrate is Si.

It is also preferable that the reactive substrate is in a solid state.

It is further preferable that the reactive substrate comprises a substrate having an edge.

It is further more preferable that the edge is defined by a hole formed in the substrate.

It is also preferable that the end of the nanotube is a top of the nanotube.

In another aspect the present invention provides a method of forming a top of a carbon nanotube, comprising the steps of: selectively contacting a selected part of a nanotube with a solid state reactive substrate having an edge; carrying out a heat treatment to the solid state reactive substrate to cause a selective solid state reaction on a contacting region of the selected part of the nanotube and the solid state reactive substrate to have the selected part only become a reaction product, wherein a boundary between the reaction product and the nanotube is self-aligned to the edge of the solid state reactive substrate; and separating the nanotube from the reaction product to define a top of the nanotube.

In a preferred embodiment the solid state reactive substrate is heated by an irradiation of a heat ray onto the solid state reactive substrate.

Preferably the heat ray is an infrared ray.

In a preferred embodiment the solid state reactive substrate is heated by applying a current between the solid state reactive substrate and the nanotube.

It is also preferable that the step of contacting the selected part of the nanotube with the reactive substrate further comprises the steps of dispersing the nanotube into an organic solvent to form a dispersion liquid; applying the dispersion liquid onto a surface of the solid state reactive substrate; and evaporating the organic solvent from the dispersion liquid to leave the nanotube on the solid state reactive substrate.

It is also preferable that the nanotube is separated from the reaction product by rapidly cooling the reaction product.

In one preferred embodiment the nanotube is a single-walled nanotube.

In another preferred embodiment the nanotube is a multi-walled nanotube.

In one preferred the nanotube is a carbon nanotube.

In another preferred embodiment the nanotube is a boron nitride based nanotube.

It is also preferable that the solid state reactive substrate is a metal.

In one preferred embodiment the solid state reactive substrate is Nb.

In another preferred embodiment the solid state reactive substrate is a semiconductor.

Preferably the solid state reactive substrate is Si.

PREFERRED EMBODIMENT

Figure 1B:
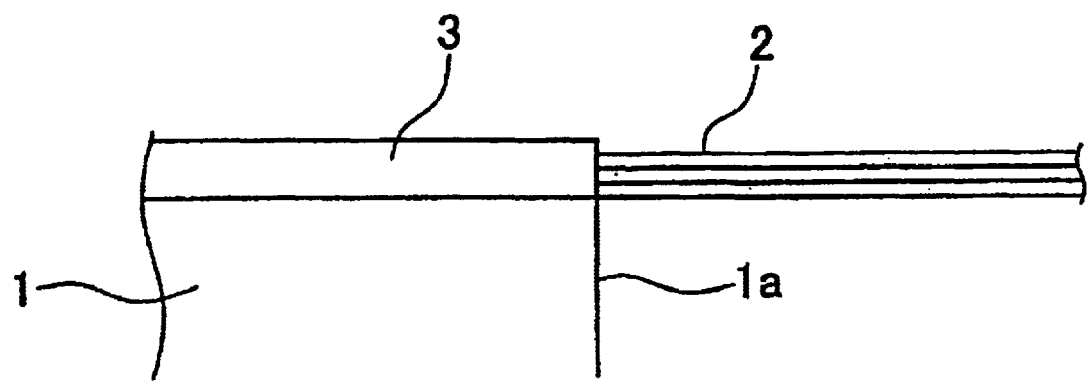
Figure 1C:
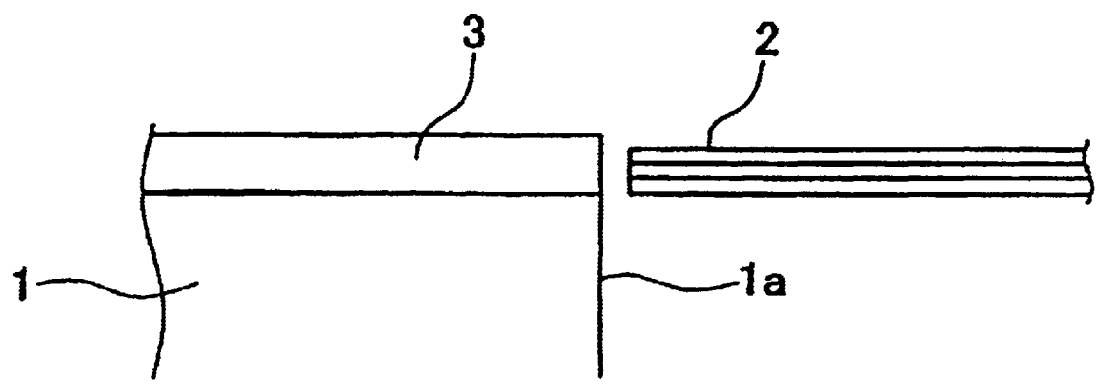

A first embodiment according to the present invention will be described in detail with reference to the drawings. The present invention is applied to process a top portion of a single-walled carbon nanotube. The single-walled carbon nanotube is cut by use of Nb as a first substrate to form a top of the single-walled carbon nanotube. FIGS. 1A through 1C are fragmentary cross sectional elevation views illustrative of a novel method of forming a top of the single-walled carbon nanotube in a preferred embodiment in accordance with the present invention.

With reference to FIG. 1A, a metal substrate, for example, a thin Nb substrate 1 was prepared as a substance which reacts with the single-walled carbon nanotube. The Nb substrate 1 has a thickness of 2 millimeters. A hole 1a having a predetermined shape was formed at a predetermined position of the Nb substrate 1 by use of an ion milling method. Further, single-walled carbon nanotubes 2 were prepared by a laser ablation method.

The single-walled carbon nanotubes 2 were dispersed by an ultrasonic wave into an organic solvent such as ethanol, 2-propanol and acetone to form a single-walled carbon nanotube dispersed liquid. This dispersed liquid is applied on an upper surface of the Nb substrate 1. An organic solvent is evaporated from the dispersed liquid. In the organic solvent, most of the single-walled carbon nanotubes 2 extend as single straight lines or are curved or form a bundle. Namely, the single-walled carbon nanotubes 2 form a three-dimensional structure in the organic solvent. After the organic solvent was evaporated, then the single-walled carbon nanotubes 2 are kept to form the three-dimensional structure over the Nb substrate 1. The single-walled carbon nanotubes 2 are in contact partially with the Nb substrate 1 at the edge of the hole 1a.

The Nb substrate 1 with the single-walled carbon nanotubes 2 was placed on a heat stage in a vacuum chamber of an ultra high vacuum transmission electron microscope (UHV-TEM, JEM-2000FXVII). The vacuum chamber was sealed and vacuumed to reach a vacuum degree in the range of 1.33E-7 Pa to 1.33E-6 Pa (1E-9 Torr to 1E-8 Torr). It is possible that the vacuum chamber is filled with an inert gas such as Ar gas or $N_2$ gas at a low pressure to form an inert gas atmosphere in the vacuum chamber.

With reference to FIG. 1B, this vacuum was still kept and an infrared ray lamp was used to irradiate an infrared ray onto the Nb substrate 1 to heat the Nb substrate 1 up to a temperature which is sufficiently high for causing a solid state reaction between the Nb substrate 1 and the single-walled carbon nanotubes 2. For example, the highest temperature of the Nb substrate 1 may be in the range of 800–1000° C. The heat time may be in the range of 50–60 minutes.

The solid state reaction appeared on the contact region between the Nb substrate 1 and the single-walled carbon nanotubes 2, whereby the contact portion of the single-walled carbon nanotubes 2 contacting with the Nb substrate 1 became a reaction product 3 of NbC, wherein a boundary between the NbC reaction product 3 and the remaining single-walled carbon nanotubes 2 was aligned to the edge of the hole 1a of the Nb substrate 1.

With reference to FIG. 1C, the irradiation of the infrared ray lamp was discontinued and subsequently the sample was rapidly cooled, whereby a crack was formed at the boundary between the NbC reaction product 3 and the remaining single-walled carbon nanotubes 2, and thus the single-walled carbon nanotubes 2 were separated from the NbC reaction product 3. As a result, the tops of the single-walled carbon nanotubes 2 were formed.

Figure 2:
FIG. 2 is a view of an image of the top portions of the single-walled carbon nanotubes taken by the transmission electron microscope in a preferred embodiment in accordance with the present invention.

FIG. 2 is a view of an image of the top portions of the single-walled carbon nanotubes 2 taken by the transmission electron microscope. From FIG. 2, it can be understood that the top portions of the single-walled carbon nanotubes 2 were selectively formed.

In accordance with the novel method of processing the nanotube of the present invention, the solid state reaction is caused on the contact regions of the single-walled carbon nanotubes 2 contacting with the Nb substrate 1 to cause the contact regions of the single-walled carbon nanotubes 2 on the Nb substrate 1 become the NbC reaction production, whereby the boundary between the NbC reaction product and the single-walled carbon nanotubes 2 is aligned to the edge of the Nb substrate 1. The boundary of the single-walled carbon nanotubes 2 from the NbC reaction product define the tops of the single-walled carbon nanotubes 2. Non-contact portions of the single-walled carbon nanotubes 2 structurally remain unchanged. Namely, the tops of the single-walled carbon nanotubes 2 are highly accurately formed without changing the structures of the single-walled carbon nanotubes 2.

The above preferred embodiment may be modified as follows. In the above embodiment, the Nb substrate 1 was used as the substance which reacts with the single-walled carbon nanotubes 2. Other metals than Nb and semiconductors such as silicon may be available as the substance which reacts with the single layer winded carbon nanotubes 2.

In the above embodiment, the single-walled carbon nanotubes 2 were used as the nanotubes. Other nanotubes such as boron nitride based nanotubes may be used.

Not only a single-walled nanotube but also multi-walled nanotubes may be used.

In place of the infrared ray irradiation, other heating methods such as a resistance heating method of applying a current between the single-walled carbon nanotubes 2 and the Nb substrate 1a may be used.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of processing a nanotube, comprising the steps of:
    contacting said nanotube with a reactive substrate having a defined edge;
    causing a solid state reaction between a selected part of said nanotube and said reactive substrate by heating said reactive substrate so as to produce in said selected part a reaction product having a boundary aligned with said defined edge; and
    separating said nanotube from said reaction product at said boundary by rapidly cooling said reaction product to define an end of said nanotube.

2. The method as claimed in claim 1, wherein said reactive substrate is heated by an irradiation of a heat ray onto said reactive substrate.

3. The method as claimed in claim 2, wherein said heat ray is an infrared ray.

4. The method as claimed in claim 1, wherein said reactive substrate is heated by applying a current between said reactive substrate and said nanotube.

5. The method as claimed in claim 1, wherein said nanotube is a single-walled nanotube.

6. The method as claimed in claim 1, wherein said nanotube is a multi-walled nanotube.

7. The method as claimed in claim 1, wherein said nanotube is a carbon nanotube.

8. The method as claimed in claim 7, wherein said reactive substrate is in a solid state.

9. The method as claimed in claim 1, wherein said nanotube is a boron nitride based nanotube.

10. The method as claimed in claim 1, wherein said reactive substrate is a metal.

11. The method as claimed in claim 1, wherein said reactive substrate is a semiconductor.

12. The method as claimed in claim 11, wherein said reactive substrate is Si.

13. The method as claimed in claim 1, wherein said end of said nanotube is a top of said nanotube.

14. The method of processing a nanotube, comprising the steps of:
    contacting said nanotube with a reactive substrate having a defined edge;
    causing a solid state reaction between a selected part of said nanotube and said reactive substrate so as to produce in said selected part a reaction product having a boundary aligned with said defined edge; and
    separating said nanotube from said reaction product at said boundary to define an end of said nanotube,
    wherein said reactive substrate is Nb.

15. The method of processing a nanotube, comprising the steps of:
    contacting said nanotube with a reactive substrate having a defined edge;
    causing a solid state reaction between a selected part of said nanotube and said reactive substrate so as to produce in said selected part a reaction product having a boundary aligned with said defined edge; and
    separating said nanotube from said reaction product at said boundary to define an end of said nanotube,
    wherein said step of contacting said nanotube with said reactive substrate comprises the steps of:
        dispersing said nanotube into an organic solvent to form a dispersion liquid;
        applying said dispersion liquid onto a surface of said reactive substrate; and evaporating said organic solvent from said dispersion liquid to leave said nanotube on said reactive substrate.

16. The method of processing a nanotube, comprising the steps of:
contacting said nanotube with a reactive substrate having a defined edge;
causing a solid state reaction between a selected part of said nanotube and said reactive substrate so as to produce in said selected part a reaction product having a boundary aligned with said defined edge; and
separating said nanotube from said reaction product at said boundary to define an end of said nanotube,
wherein said defined edge is defined by a hole formed in said substrate.

17. A method of forming a top of a nanotube, comprising the steps of:
contacting a nanotube with a solid state reactive substrate having a defined edge;
carrying out a heat treatment of said solid state reactive substrate to cause a solid state reaction in a region of said nanotube and said solid state reactive substrate so as to produce in a selected part of said nanotube a reaction product having a boundary aligned with said defined edge of said solid state reactive substrate; and
separating said nanotube from said reaction product at said boundary by rapidly cooling said reaction product to define a top of said nanotube.

18. The method as claimed in claim 17, wherein said solid state reactive substrate is heated by an irradiation of a heat ray onto said solid state reactive substrate.

19. The method as claimed in claim 18, wherein said heat ray is an infrared ray.

20. The method as claimed in claim 17, wherein said solid state reactive substrate is heated by applying a current between said solid state reactive substrate and said nanotube.

21. The method as claimed in claim 17, wherein said nanotube is a single-walled nanotube.

22. The method as claimed in claim 17, wherein said nanotube is a multi-walled nanotube.

23. The method as claimed in claim 17, wherein said nanotube is a carbon nanotube.

24. The method as claimed in claim 17, wherein said nanotube is a boron nitride based nanotube.

25. The method as claimed in claim 17, wherein said solid state reactive substrate is a metal.

26. The method as claimed in claim 17, wherein said solid state reactive substrate is a semiconductor.

27. The method as claimed in claim 26, wherein said solid state reactive substrate is Si.

28. The method of forming a top of a nanotube, comprising the steps of:
contacting a nanotube with a solid state reactive substrate having a defined edge;
carrying out a heat treatment of said solid state reactive substrate to cause a solid state reaction in a region of said nanotube and said solid state reactive substrate so as to produce in a selected part of said nanotube a reaction product having a boundary aligned with said defined edge of said solid state reactive substrate; and
separating said nanotube from said reaction product at said boundary to define a top of said nanotube,
wherein said step of contacting said nanotube with said reactive substrate further comprises the steps of:
dispersing said nanotube into an organic solvent to form a dispersion liquid;
applying said dispersion liquid onto a surface of said solid state reactive substrate; and
evaporating said organic solvent from said dispersion liquid to leave said nanotube on said solid state reactive substrate.

29. The method of forming a top of a nanotube, comprising the steps of:
contacting a nanotube with a solid state reactive substrate having a defined edge;
carrying out a heat treatment of said solid state reactive substrate to cause a solid state reaction in a region of said nanotube and said solid state reactive substrate so as to produce in a selected part of said nanotube a reaction product having a boundary aligned with said defined edge of said solid state reactive substrate; and
separating said nanotube from said reaction product at said boundary to define a top of said nanotube,
wherein said solid state reactive substrate is Nb.

* * * * *